United States Patent [19]

Bruener et al.

[11] Patent Number: 4,819,593

[45] Date of Patent: Apr. 11, 1989

[54] PIVOTING BALANCER SYSTEM

[75] Inventors: Patrick J. Bruener, Hartland; Joseph R. Harkness, Germantown; Norbert M. Vogl, Milwaukee; Glen C. Eifert, Hartford, all of Wis.

[73] Assignee: Briggs & Stratton Corporation, Wauwatosa, Wis.

[21] Appl. No.: 187,440

[22] Filed: Apr. 28, 1988

[51] Int. Cl.[4] .............................................. F16F 15/28
[52] U.S. Cl. ................................ 123/192 B; 74/603; 74/604
[58] Field of Search ....................... 123/192 R, 192 B; 74/603, 604

[56] References Cited

U.S. PATENT DOCUMENTS

| | | | |
|---|---|---|---|
| 636,606 | 11/1899 | Winton | 74/603 |
| 1,310,090 | 7/1919 | Ricardo | 74/603 |
| 1,410,019 | 3/1922 | Krause | 74/603 |
| 1,588,720 | 6/1926 | Gilbert | 74/603 |
| 1,654,515 | 12/1927 | Tompkins | 74/603 |
| 1,762,860 | 6/1930 | Gilbert | 74/603 |
| 1,794,715 | 3/1931 | Knight | 74/603 |
| 2,235,160 | 3/1941 | Ljungstrom | 123/192 R |
| 2,245,239 | 6/1941 | Williams | 74/604 |
| 3,112,658 | 12/1963 | Berlyn | 74/603 |
| 3,415,237 | 12/1968 | Harkness | 123/192 R |
| 3,457,804 | 7/1969 | Harkness | 74/604 |
| 3,520,285 | 7/1970 | Klauder, Jr. | 123/192 R X |
| 3,903,995 | 9/1975 | Irgens | 123/192 R X |
| 4,074,589 | 2/1978 | Nakamura et al. | 74/604 |
| 4,174,698 | 11/1979 | Dupin | 123/192 B |
| 4,290,395 | 9/1981 | Sakano et al. | 123/192 B |
| 4,351,202 | 9/1982 | Summers | 74/604 |
| 4,414,934 | 11/1983 | Vogl et al. | 123/192 B |
| 4,466,388 | 8/1984 | Tryhorn | 74/604 X |
| 4,470,387 | 9/1984 | Gonska | 123/192 B |
| 4,481,918 | 11/1984 | Morton | 123/192 B |
| 4,628,876 | 12/1986 | Fujikawa et al. | 123/192 B |
| 4,656,981 | 4/1987 | Murata et al. | 123/192 B |

FOREIGN PATENT DOCUMENTS

| | | |
|---|---|---|
| 217244 | 9/1961 | Austria . |
| 886890 | 11/1971 | Canada . |
| 1935121 | 1/1971 | Fed. Rep. of Germany . |
| 3120190 | 5/1982 | Fed. Rep. of Germany . |
| 56645 | 3/1987 | Japan .................................. 74/604 |

OTHER PUBLICATIONS

Pp. 2329-2338 of an article entitled "Methods of Balancing Single Cylinder Engines" by Joseph R. Harkness, published by the Society of Automotive Engineers under No. 680571 and distributed at the S.A.E. meeting of Sep. 9-12, 1968 in Milwaukee, Wis.
Pp. 206-209 from Marks, *Mechanical Engineers' Handbook*, Fifth Edition, 1951.
McCulloch Corporation brochure entitled "Chain Saw Model B P-1", Jan., 1962.
Articles by Nakano and Iwase entitled "Present and Future of Countermeasures for Noise and Vibration Problems of Small Passenger Cars", JSAE Review, No. 4, Mar., 1981. English version 4 pp, Japanese publication comprising pp. 1003–1010.
Lombardini technical brochure entitled "Dynamic Balancer".

*Primary Examiner*—Tony M. Argenbright
*Assistant Examiner*—Eric R. Carlberg
*Attorney, Agent, or Firm*—Andrus, Sceales, Starke & Sawall

[57] ABSTRACT

A balance system for an internal combustion engine or the like includes a counterbalance weight pivotally mounted to the crankcase and driven in a reciprocating manner by a link assembly connecting the weight to an eccentric on the crankshaft. The pivoting weight not only counterbalances the piston acceleration and deceleration forces but also cancels the torsional forces created by the weight as it pivotally moves through an arc in response to piston movement. This is accomplished by locating the center of gravity of the balance weight between the piston bore centerline and the stationary pivot of the balance weight itself. This location for the center of gravity causes a torque to be generated by a force couple created by the piston inertial force vector, the balance weight interial force vector, and the distance between them. This torque counteracts the torque generated by angular acceleration of the balance weight itself, to thereby substantially eliminate all torsional vibrations.

17 Claims, 2 Drawing Sheets

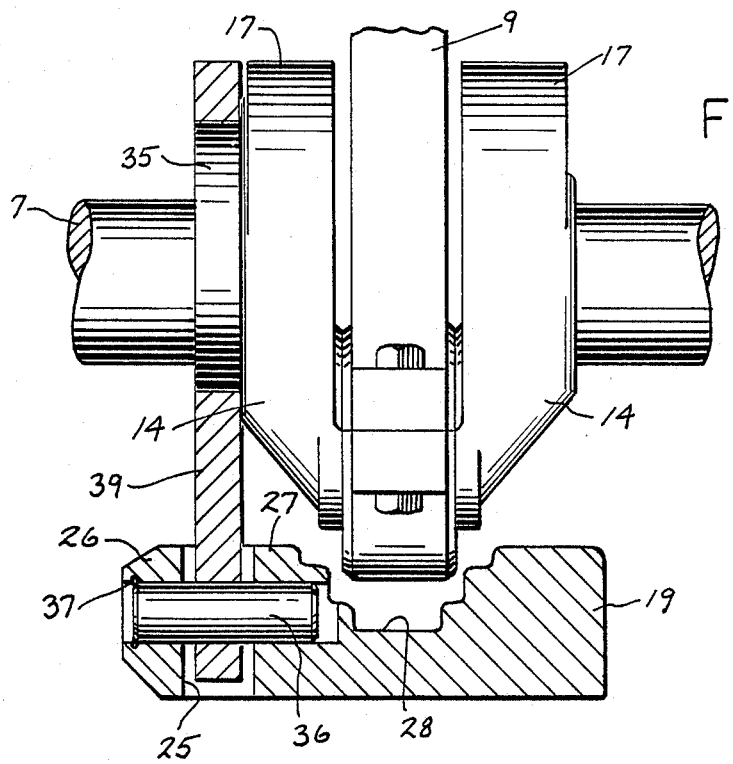
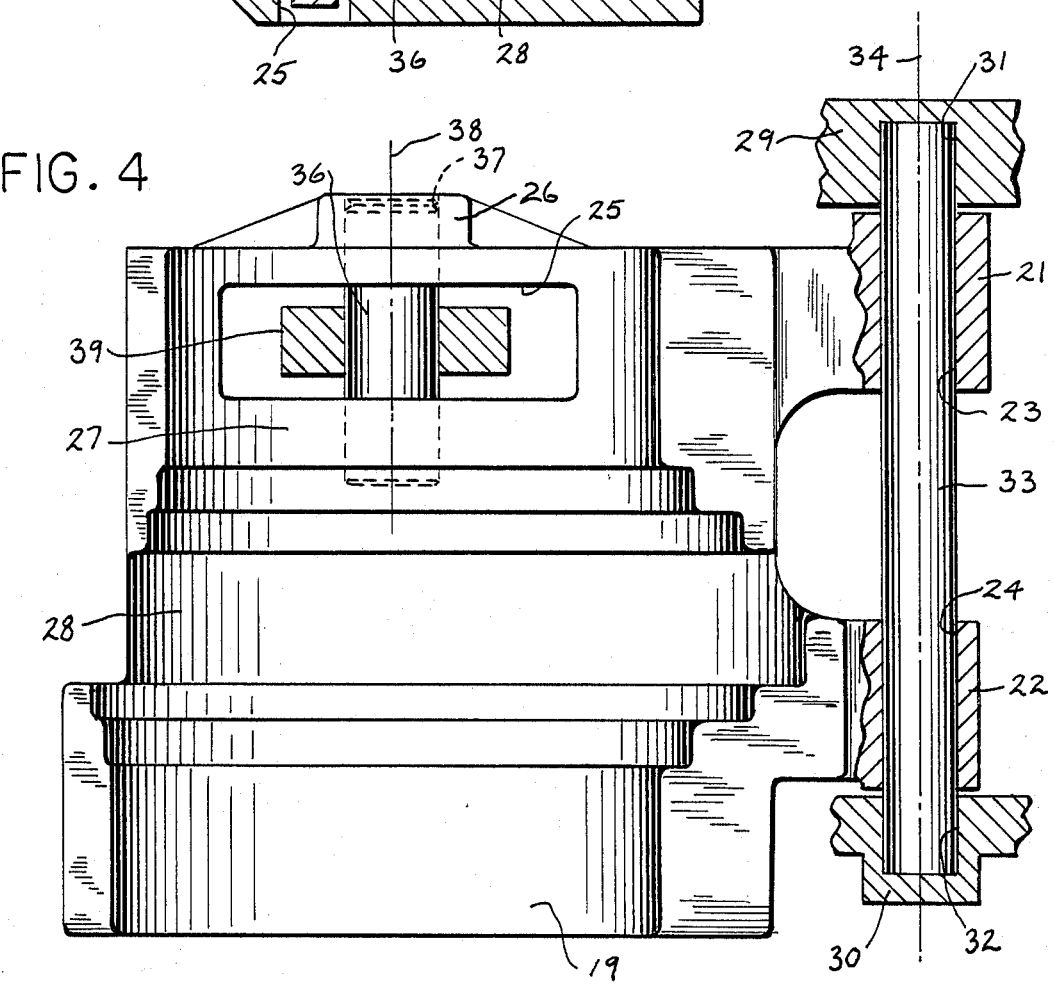

PIVOTING BALANCER SYSTEM

BACKGROUND OF THE INVENTION

The present invention relates to single cylinder engines such as those widely used for powering lawn mowers, sump pumps, portable generators and the like, and is more particularly related to an engine having a pivoting counterbalance weight that cancels not only the piston acceleration and deceleration forces but also the torsional forces created by the pivoting weight itself in order to reduce torsional vibration forces in the engine.

The basic cause of vibration in a single cylinder engine is piston reciprocation. The piston is started and stopped twice during each rotation of the crankshaft, and reactions to the forces accelerating and decelerating the piston are imposed upon the engine body as vibration in directions parallel to the cylinder axis. In installations such as lawn mowers and the like, the engine produces a vibration that is transmitted through the machine to the operator. While not intolerable for relatively short periods of operation, such vibration is uncomfortable and could produce operator fatigue in cases of continuous operation over an extended period of time. Even in an installation where there is no element of operator fatigue, such as sump pumps or portable generators, engine vibration is undesirable because it causes maintenance problems and tends to reduce the useful life of the machine.

To some extent such vibrations can be decreased by providing the engine with a counterweight fixed on its crankshaft, and located at the side of the crankshaft axis opposite the crankpin by which the connecting rod is connected to the crankshaft. Such a crankshaft counterweight produces a net resultant centrifugal force vector that is diametrically opposite to the crankpin. This centrifugal force vector of the crankshaft counterweight has a component parallel to the cylinder axis that varies as the crankshaft rotates and acts in opposition to the acceleration and deceleration forces on the piston assemblage comprising the piston, its wrist pin and the connecting rod.

If the mass of the crankshaft counterweight is great enough, its force vector parallel to the cylinder axis can cancel the acceleration and deceleration forces on the piston assemblage. Such a force cancelling condition exists when the crankshaft counterweight is of such mass and radius of gyration that its centrifugal force cancels the centrifugal force due to the rotating masses of the crankpin and the crank end of the connecting rod and is large enough so that it also offsets the acceleration and deceleration forces of the piston. Such counterweighting can be designated as a condition of 100% overbalance.

Unfortunately, centrifugal force due to the crankshaft counterweight also has a component transverse to the cylinder axis by which vibration is produced. As the mass of the crankshaft counterweight is increased, the vibration transverse of the cylinder axis also increases, becoming excessive for practical purposes when the condition of 100% of overbalance is approached. For this reason most single cylinder engines incorporate crankshaft counterweights having a mass that provides a condition of about 50% overbalance so that the centrifugal force due to the counterweight overbalance has a component along the cylinder axis that is equal to about 50% of the acceleration and deceleration forces on the piston assemblage. This represents a compromise between the severe vibration in directions parallel to the cylinder axis that would result with the condition of no overbalance and the severe vibration transverse of the cylinder axis that would result with a condition of 100% overbalance. With the compromise condition of about 50% overbalance there is of course some vibration parallel to the cylinder axis and some vibration transverse to it. Unsatisfactory as it is, the use of crankshaft counterweights that provide a condition of about 50% overbalance is the typical balance system utilized with commercially available engines of this type.

Several balancing systems have been proposed for further reducing vibration producing forces in single cylinder engines. These systems typically utilize a balancing weight pivotally connected to the crankcase and driven in a reciprocal manner by an arrangement that connects the balancing weight to the crankshaft. Examples of such pivoting balancer systems can be found in the following United States patents:

| Patent No. | Inventor | Issue Date |
|---|---|---|
| 1,310,090 | Ricardo | 1919 |
| 1,588,720 | Gilbert | 1926 |
| 1,794,715 | Knight | 1931 |
| 1,654,515 | Tompkins | 1927 |
| 3,457,804 | Harkness | 1969 |
| 4,351,202 | Summers | 1982 |
| 4,470,387 | Gonska | 1984 |
| 4,481,918 | Morton | 1984 |

In the pivoting balance systems noted above, the balance weight reciprocally moves through an arc as the piston reciprocates along the cylinder bore axis. With the center of gravity of the balance weight being substantially in line with the cylinder bore axis, this arcuate motion of the balance weight provides the forces required to balance or cancel the piston and rod inertial forces, but it also creates an undesirable torsional vibration of the engine mass, because the force couple required to rotate the balance weight through its angular motion causes torsional acceleration of the engine mass.

U.S. Pat. No. 4,656,981 illustrates another type of balancing system in which a counterbalance weight is not pivoted on the crankcase, but instead is reciprocally driven on a pin projecting from the bottom of the crankcase. The weight is driven by a pair of links journalled on a pair of eccentrics on the crankshaft.

SUMMARY OF THE INVENTION

A balance system for an internal combustion engine or the like includes a counterbalance weight pivotally mounted to the crankcase and driven in a reciprocating manner by a link assembly connecting the weight to the crankshaft. The pivoting weight counterbalances the piston acceleration and deceleration forces, and does so without generating torsional engine vibration as it pivotally moves through an arc in response to piston movement. This is accomplished by properly locating the center of gravity of the counterbalance weight between the cylinder bore axis and the crankcase stationary pivot for the counterbalance weight. This location for the center of gravity establishes a force couple between the piston inertial force vector and the counterbalance weight inertial force vector. This force couple creates the torque necessary to rotate the counterbalance weight through the required angular displacement without producing extraneous forces or torques which would induce torsional vibration in the engine itself.

In order to prevent torsional engine vibration associated with angular motion of the pivoting counterbalance weight, the counterbalancing means of the present invention comprises a counterbalance weight defining a center of gravity, first mounting means for pivotally connecting the counterbalance weight to the crankcase to provide a stationary pivot axis for the counterbalance weight, second mounting means for pivotally connecting the counterbalance weight to the crankshaft to provide reciprocation of the counterbalance weight, and having the center of gravity of the counterbalance weight disposed between the cylinder bore axis and the stationary pivot axis. Proper location of the center of gravity of the balance weight is accomplished by treating the balance weight as a rotational body with its stationary pivot axis being the axis of suspension and a point on the cylinder bore axis being the center of percussion.

The present invention thus provides a means for counterbalancing the piston assemblage of a single cylinder engine so as to reduce to a negligible amount the vibration in a direction parallel to the cylinder axis as well as in a direction perpendicular to the cylinder axis. The pivoting balancer system of the present invention is simple and inexpensive, is automatically lubricated without interfering with normal engine lubrication, is highly reliable and trouble free, and may be incorporated in existing engine designs without requiring major modifications thereof.

Other features and advantages of the invention will become apparent to those skilled in the art upon reviewing the following detailed description, the drawings, and the appended claims.

BRIEF DESCRIPTION OF THE DRAWINGS

The drawings illustrate the best mode presently contemplated of carrying out the invention.

In the drawings:

FIG. 3 is a cross sectional view of the counterbalance taken along the plane of the line 3—3 in FIG. 2; and FIG. 4 is a cross sectional view of the counterbalance taken along the plane of the line 4—4 in FIG. 2.

DESCRIPTION OF THE PREFERRED EMBODIMENT

Figure 1:
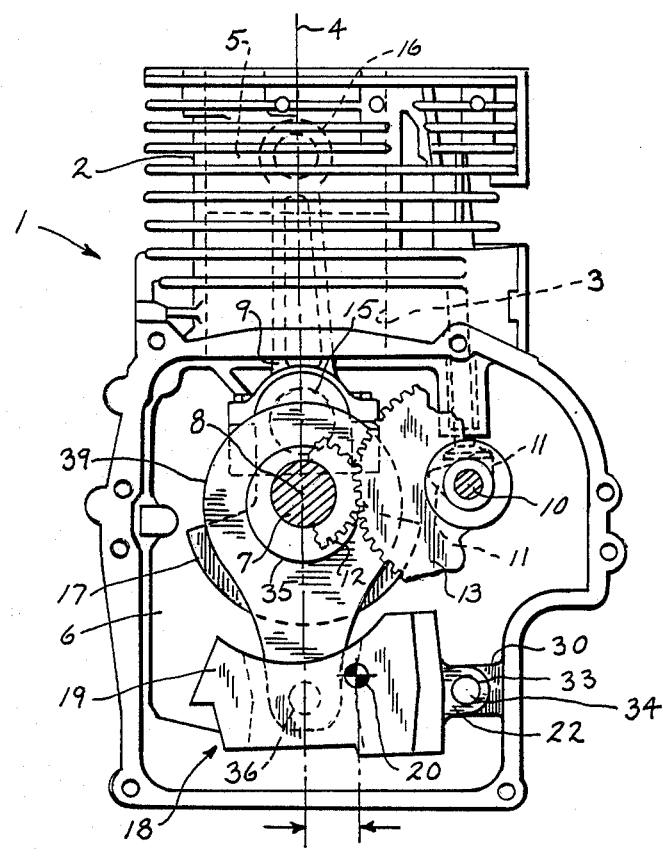
FIG. 1 is a side view in elevation with parts broken away to show the counterbalance of the present invention in relation to other moving engine parts.

Referring now to the drawings, FIG. 1 illustrates a single cylinder engine generally designated by the numeral 1 having a cylinder barrel 2 that includes a cylinder 3 which defines a cylinder axis or piston bore centerline 4 and in which a piston 5 is reciprocated, and having a crankcase 6 in which a crankshaft 7 defining a crankshaft axis 8 is rotatable. Piston 5 is of course connected with crankshaft 7 by means of a connecting rod 9.

For purposes of illustration, engine 1 is shown in FIG. 1 as being of the four cycle type, with tappets (shown in phantom lines) that are actuated in timed relation to the reciprocation of piston 5 by means of a camshaft 10 having cams 11 thereon. Camshaft 10 is driven from crankshaft 7 by means of a timing gear 12 on crankshaft 7 meshing with a cam gear 13 on camshaft 10. It will be understood, however, that the present invention is equally applicable to two cycle engines. Additionally, those skilled in the art will recognize that the improved counterbalancing means of the present invention may be utilized with machines other than internal combustion engines and which are the general type that comprises a cylinder in which a piston is reciprocal, a crankshaft rotatable in a crankcase, and a connecting rod connecting the piston with the crankshaft. For example, one typical machine of this type is a reciprocating compressor pump.

The crankshaft 7 of engine 1 has its opposite ends journalled or rotatably received in opposite end walls of crankcase 6. Crankshaft 7 also includes a pair of crankarms 14 each extending transversely to crankshaft axis 8, and the two crankarms 14 are connected by a crankpin 15 that is offset with respect to crankshaft axis 8 and parallel thereto. The crank end of connecting rod 9 is journalled on crankpin 15, and the piston end of connecting rod 9 is connected to piston 5 by means of a wrist pin 16.

The crankarms 14 extend diametrically across crankshaft axis 8 to the side thereof opposite crankpin 15 where each is formed with an enlargement or mass that provides a conventional counterweight 17. The counterweights 17 are substantially the same mass and moment, and are likewise symmetrically disposed with respect to cylinder axis 4. The mass and moment of counterweights 17 is such that they counterbalance crankpin 15 and the crank end of connecting rod 9, but do not substantially overbalance that rotating assembly. Balancing of the acceleration and deceleration forces of piston 5 without creating unwanted torsional forces is provided by the counterbalance means 18 hereinafter to be described.

The counterbalance means 18 comprises a counterbalance weight or member 19 having a center of gravity 20, first mounting means pivotally connecting weight 19 to crankcase 6 to provide a stationary pivot axis for weight 19, and second mounting means for pivotally connecting counterbalance weight 19 to crankshaft 7 which provides a counterbalance weight wrist pin axis for weight 19. More particularly, counterbalance weight 19 includes a body having a pair of spaced ears 21, 22 (see FIG. 4) projecting therefrom, each of which includes a bore 23, 24 respectively formed therethrough. Another opening 25 is formed through the body of counterbalance weight 19 adjacent one side thereof which forms a pair of opposite spaced apart journal portions 26, 27, the purpose of which will hereinafter be described. As best shown in FIG. 3, the upper surface of the body of counterbalance weight 19 includes a cutout 28 formed therein which permits weight 19 to be mounted closely adjacent to crankshaft 7 and yet avoids interference with crankpin 15 and the crank end of connecting rod 9 during its orbital motion.

Figure 2:
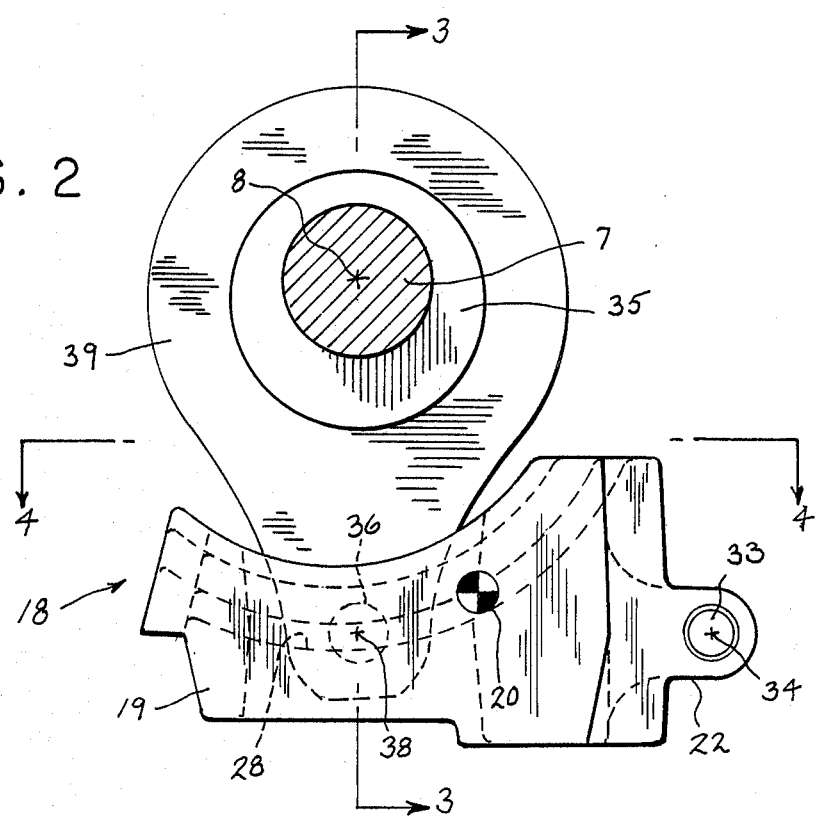
FIG. 2 is an enlarged side view in elevation of the counterbalance shown in FIG. 1.

The mounting means for pivotally connecting weight 19 to crankcase 6 includes a pair of fixed spaced apart bosses 29, 30. Boss 29 projects internally from the inner surface of crankcase 6 and boss 30 projects externally from crankcase 6. Bosses 29, 30 each include a blind opening 31, 32 respectively aligned with openings 23, 24 of ears 21, 22. A pivot pin 33 extends through openings 23, 24 in ears 21, 22 with its opposite ends journalled in openings 31, 32 of bosses 29, 30, and defines a stationary pivot axis 34 for pivotally connecting counterbalance weight 19 to crankcase 6. As shown best in FIGS. 1 and 2, stationary pivot axis 34 is parallel to crankshaft axis 8 and spaced laterally to one side of cylinder axis 4. In an alternate form, weight 19 may only have a single ear projecting therefrom through which pin 33 extends. In still another alternate form, ears 21, 22 may be completely integral with the body of weight 19, i.e. not projecting therefrom, so that pin 33 extends through the body of weight 19 itself. Also, only a single boss projecting from crankcase 6 could be used and weight 19 could be pivotally mounted thereto in a cantilevered manner if desired.

The mounting means for pivotally connecting counterbalance weight 19 to crankshaft 7 includes an eccentric member 35 on crankshaft 7 disposed axially outward of and adjacent to one of the crankarms 14. Eccentric member 35 defines an eccentric axis which is parallel to and spaced to the side of the crankshaft axis 8 angularly opposite the crankpin 15. This mounting means also includes a counterweight wrist pin 36 bridging the opening 25 in weight 19, and as shown best in FIG. 4, wrist pin 36 has its opposite ends journalled in journal portions 26, 27 of weight 19. Pin 36 is held in position by means of a snap ring 37 seen best in FIG. 3. Wrist pin 36 defines a reciprocally movable pivot axis 38 for counterbalance weight 19 which moves through an arc as piston 5 is reciprocated. Finally, this second mounting means includes a link 39 connected or journalled at one end on eccentric 35 and connected or journalled at its other end on wrist pin 36. Link 39 confines counterbalance weight 19 to reciprocal motion substantially parallel to cylinder axis 4. It should also be noted that since the axis of eccentric 35 is at a smaller distance from crankshaft axis 8 than that of crankpin 15 the upper end of link 39 describes an orbit substantially smaller than that of the crank end of connecting rod 9. Link 39 is so arranged that its longitudinal centerline is substantially parallel to cylinder axis 4 so that axis 38 defined by pivot pin 36 moves along an arcuate path substantially in line with cylinder axis 4. However, link 39 may also be arranged such that its longitudinal centerline is disposed at an angle to cylinder axis 4 such that pin 36 might be located to the left or to the right of the location shown in FIGS. 1 and 2. In fact, the longitudinal centerline of link 39 might even be at a right angle or greater to axis 4. In any of the above arrangements it may be necessary to modify the form or shape of weight 19 in order to accommodate a connection to link 39. Nevertheless, any of the above arrangements are within the scope of the present invention so long as the link 39 provides pivoting reciprocal motion for weight 19 and so long as the center of gravity 20 of weight 19 is disposed between the cylinder axis or cylinder bore centerline 4 and the stationary pivot axis 34 for weight 19.

The upper big end portion of link 39 which is carried on eccentric 35 moves orbitally, and therefore must be considered as part of a system that also includes the rotating conventional counterweights 17 on crankshaft 7 for counterbalancing the rotating mass assembly that comprises the crankpin 15 and the crank end of connecting rod 9. The lower small end portion of link 39 which is carried on the counterweight pin 36 moves arcuately with weight 19, and therefore must be considered as part of a system that also includes counterbalance weight 19. Link 39, however, is intended to function merely as a connection means for connecting weight 19 to eccentric 35 and transmit reciprocal motion to weight 19. Link 39 is not intended to contribute in any significant manner to counterbalancing of the moving parts of the engine 1. Thus, in an ideal case, link 39 would have no mass and as a result no weight. However, since such an ideal case cannot be obtained the actual weight of link 39 must be held to a minimum and its weight, of course, must be considered in the overall balancing system, as noted above. Preferably, the weight of the small end portion of link 39 is less than about 10% of the weight of counterbalance member 19, and more preferably less than 3%. In the embodiment shown, link 39 is composed of aluminum having a total weight of about 130 grams with its small end contributing about 35 grams of that total weight. Since counterbalance member 19 typically weighs between about 3500 grams and about 4000 grams, preferably 3900 grams, the small end of link 39 comprises about 1% or less of the total weight of the counterbalancing mass, namely, member 19, pin 36 and the small end portion of link 39. Additionally, if link 39 is composed of cast iron, the weight of its small end portion would increase to between about 100 grams to about 120 grams and thus comprise only about 3% or less of tho total weight of the counterbalancing mass. Therefore, the reciprocating counterbalance system is effective to produce inertia forces which are almost exclusively parallel to cylinder axis 4 and which are essentially 180° out of phase with the reciprocal motion of piston 5. Consequently, the inertia forces of weight 19 are affective to substantially cancel piston acceleration and deceleration forces without producing any appreciable vibration transverse to the cylinder axis 4. This latter feature will hereinafter now be described.

It will be observed that the counterbalance means 18 counteracts vibration transverse to cylinder axis 4, as described below. As noted previously, weight 19 moves through a small arc as piston 5 reciprocates. This motion not only provides the forces required to balance the piston and connecting rod inertial forces, but could create a torque generating torsional vibration transverse to cylinder axis 4. This torque is eliminated by locating the center of gravity 20 of weight 19 at the proper location between the piston bore centerline or cylinder axis 4 and the stationary pivot axis 34 of weight 19. Proper location of the center of gravity 20 of the weight 19 is achieved by locating the center of percussion of the weight 19 at a point on the cylinder bore centerline 4, with the axis of suspension of the weight 19 being the stationary pivot axis 34.

The present invention thus provides a counterbalance system for a single cylinder engine that is simple, inexpensive and dependable, and which substantially cancels the acceleration and deceleration reaction forces of the piston as well as torsional forces that might create vibrations transverse to the cylinder axis. The counterbalance system may readily be accommodated within the crankcase of conventional engines without requiring any significant modifications thereof.

Various modes of carrying out the invention are contemplated as being within the scope of the following claims particularly pointing out and distinctly claiming the subject matter regarded as the invention.

We claim:

1. In an apparatus of the type having a cylinder defining a cylinder axis and a crankcase, a crankshaft rotatably mounted in the crankcase, said crankshaft defining a crankshaft axis substantially normal to said cylinder axis and having a crankpin flanked by a pair of crankarms that connect the crankpin to the crankshaft in eccentrically offset relation to the crankshaft axis, and a piston axially reciprocable in the cylinder and connected with the crankpin, counterbalancing means comprising:

a counterbalance weight defining a center of gravity;

first mounting means for pivotally connecting said counterbalance weight to said crankcase to provide a stationary pivot axis for said weight;

second mounting means for pivotally connecting said counterbalance weight to said crankshaft to provide reciprocal motion for said weight; and the center of gravity of said counterbalance weight being disposed between said cylinder axis and said stationary pivot axis.

2. The counterbalance means of claim 1 wherein said stationary pivot axis is parallel to said crankshaft axis and spaced from said cylinder axis.

3. The counterbalance means of claim 2 wherein said counterbalance means includes a body, and said first mounting means includes pivot means on said body.

4. The counterbalance means of claim 3 wherein said pivot means includes at least one ear projecting from the body of said counterbalance weight.

5. The counterbalance means of claim 4 wherein said first mounting means further includes at least one fixed boss projecting from said crankcase and a pivot pin interconnecting said ear and boss.

6. The counterbalance means of claim 5 wherein said first mounting means includes a pair of spaced ears projecting from the body of said weight and a pair of spaced fixed bosses projecting from said crankcase and a pivot pin extending through said ears and journalled at opposite ends in said bosses.

7. The counterbalance means of claim 1 wherein said second mounting means includes a reciprocally movable wrist pin axis disposed parallel to said crankshaft axis.

8. The counterbalance means of claim 7 wherein the center of gravity of said weight reciprocally moves along an arcuate path substantially parallel to said cylinder axis.

9. The counterbalance means of claim 8 wherein said second mounting means includes at least one eccentric member on the crankshaft disposed axially outward of and adjacent to one of the crankarms and defining an eccentric axis parallel to and spaced to the side of the crankshaft axis angularly essentially opposite the crankpin, a wrist pin connected to said counterbalance weight defining said reciprocally movable wrist axis, and at least one link connected at one end to said at least one eccentric member and at its other end to said wrist pin and disposed transverse to said crankshaft axis.

10. The counterbalance means of claim 9 wherein said counterbalance weight includes a body having an opening therein defining a pair of opposite journal portions, and said wrist pin extending across said opening and mounted at opposite ends in said journal portions.

11. The counterbalance means of claim 1 wherein said counterbalance weight defines a center of percussion, and said center of percussion is substantially coincident with said cylinder axis, and further defines an axis of suspension, and said axis of suspension is coincident with said stationary pivot axis.

12. In an apparatus of the type having a cylinder defining a cylinder axis and a crankcase, a crankshaft rotatably mounted in the crankcase, said crankshaft defining a crankshaft axis substantially normal to said cylinder axis and having a crankpin flanked by a pair of crankarms that connect the crankpin to the crankshaft in eccentrically offset relation to the crankshaft axis, and a piston axially reciprocable in the cylinder and connected with the crankpin, counterbalancing means comprising:

a counterbalance weight, said counterbalance weight defining a mass providing substantially the entire counterbalancing for said piston;

mounting means on the crankcase for pivotally connecting said counterbalance weight thereto to provide a stationary pivot axis for said weight;

connection means for connecting said counterbalance weight to said crankshaft, said connection means comprises a member separate from said counterbalance weight having one end pivotally connected to said counterbalance weight and said one end provides less than about 10% of the mass effective for the counterbalancing of said piston; and eccentric means on said crankshaft for imparting reciprocal pivotal motion to said counterbalance means through said connection means.

13. The counterbalancing means of claim 12 wherein said connection means comprises a link having a big end portion journalled on said eccentric means and a small end portion pivotally mounted to said counterbalance weight.

14. The counterbalancing means of claim 13 wherein the pivotal connection of said link to said weight comprises a pin bridging an opening in said weight with said other end of said link journalled thereon.

15. The counterbalancing means of claim 13 wherein said mounting means comprises a boss projecting from said crankcase and a pivot pin connecting said boss and said counterbalance weight.

16. The counterbalancing means of claim 12 wherein said counterbalance weight defines a center of gravity, and said center of gravity is located between said cylinder axis and said stationary pivot axis.

17. The counterbalancing means of claim 13 wherein the small end portion of said link comprises less than about 3% of the mass effective for the counterbalancing of said piston.

* * * * *